(12) United States Patent
Phillips

(10) Patent No.: US 7,395,180 B2
(45) Date of Patent: Jul. 1, 2008

(54) EFFICIENT TRANSLATION OF DATA FROM A TWO-DIMENSIONAL ARRAY TO A WEDGE

(75) Inventor: Justin E. Phillips, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/435,542

(22) Filed: May 17, 2006

(65) Prior Publication Data

US 2007/0271063 A1    Nov. 22, 2007

(51) Int. Cl.
G01C 17/00 (2006.01)
G01C 19/00 (2006.01)

(52) U.S. Cl. ............................ 702/151; 345/605; 378/4; 702/95

(58) Field of Classification Search ................ 702/95, 702/66, 150–153, 155; 367/88, 103, 131, 367/138, 153; 381/92; 382/103; 378/4; 341/164; 250/330; 345/17, 589–602, 605
See application file for complete search history.

(56) References Cited

U.S. PATENT DOCUMENTS

| | | | |
|---|---|---|---|
| 3,742,436 A | 6/1973 | Jones | 367/131 |
| 4,670,653 A * | 6/1987 | McConkle et al. | 250/330 |
| 4,951,268 A | 8/1990 | Grall | 367/88 |
| 5,303,208 A | 4/1994 | Dorr | 367/153 |
| 5,563,810 A | 10/1996 | Cherry et al. | 702/95 |
| 5,898,791 A | 4/1999 | Garcia | 382/103 |
| 6,011,595 A | 1/2000 | Henderson et al. | 348/590 |
| 6,205,224 B1 | 3/2001 | Underbrink | 381/92 |
| 6,256,366 B1 | 7/2001 | Lai | 378/4 |
| 6,678,346 B2 | 1/2004 | Hsieh | 378/4 |
| 6,721,235 B2 | 4/2004 | Chiang et al. | 367/138 |
| 6,738,311 B1 | 5/2004 | Guigné | 367/88 |
| 6,778,187 B1 * | 8/2004 | Yi | 345/605 |
| 6,778,468 B1 | 8/2004 | Nishimori et al. | 367/103 |
| 6,873,282 B1 | 3/2005 | Murphy | 341/164 |
| 2003/0214880 A1 | 11/2003 | Rowe | |

* cited by examiner

Primary Examiner—John E. Barlow, Jr.
Assistant Examiner—John H Le
(74) Attorney, Agent, or Firm—Tarolli, Sundheim, Covell & Tummino LLP

(57) ABSTRACT

Systems and methods are provided for drawing a wedge from an array of data. An angular reference table contains a plurality of angle values. An angle sampler samples a subset of angle values for a given arc of a plurality of arcs that will constitute the wedge from the angular reference table to provide an even sampling along a representative portion of the arc. A pixel locator determines horizontal and vertical coordinates for each of the sampled angle values. A pixel indexer determines an associated row and column of the two-dimensional array for each of the sampled angle values and retrieves a color for each of the sampled angle values from the two-dimensional array. A graphical renderer draws pixels with the retrieved colors at the determined horizontal and vertical coordinates.

21 Claims, 3 Drawing Sheets

EFFICIENT TRANSLATION OF DATA FROM A TWO-DIMENSIONAL ARRAY TO A WEDGE

BACKGROUND OF THE INVENTION

1. Technical Field

The invention relates generally to sensor systems and, more specifically, to systems and methods for displaying sensor data.

2. Description of the Prior Art

In some sensor and graphical applications, it is desirable to translate data from a two-dimensional, rectangular array into a wedge-shaped graphic. For example, in many sensor applications, sensors are arranged as to monitor a wedge of space. Each individual sensor can be conceptualized as scanning a smaller wedge-spaced beam in the wedge of space to produce a measurement at each of a plurality of radial distances. The measurements for each beam, as taken, represent a single vector of data. The combined measurements for the plurality of beams can be conceptualized as a rectangular array.

In most sensing applications, it is desirable to provide data to a user in a manner that reflects the geography that is being sensed. While a user may be able to puzzle out the meaning of a rectangular display of data given time, displaying the sensor data as a wedge allows the user to quickly understand the importance of the sensed data. It will be appreciated that it is desirable to perform the translation efficiently, however, to avoid excessive computational expense while providing the user with a real-time display of the sensed wedge of space.

SUMMARY OF THE INVENTION

In accordance with one aspect of the present invention, a computer program product is provided for drawing a wedge from an array of data having rows and columns. An angular reference table contains a plurality of angle values. An angle sampler samples a subset of angle values for a given arc of a plurality of arcs that will comprise the wedge from the angular reference table, such that the sampled angle values provide an even sampling along a representative portion of the length of the arc. A pixel locator determines horizontal and vertical coordinates for each of the sampled angle values. A pixel indexer determines an associated row and column of the two-dimensional array for each of the sampled angle values and retrieves a color for each of the sampled angle values from the two-dimensional array according to the determined row and column. A graphical renderer draws pixels with the retrieved colors at the determined horizontal and vertical coordinates.

In accordance with another aspect of the present invention, a method is provided for drawing a wedge from an array of data having rows and columns. An arc is selected from the plurality of arcs comprising the wedge. The following steps are repeated until all of a plurality of angle values associated with the selected arc have been selected. A set of at least one angle value is selected for the selected arc. Horizontal and vertical coordinates are determined for each of the selected set of at least one angle value. Associated row and column indices are determined for each of the selected set of at least one angle value. Associated pixel colors are retrieved from the two-dimensional array with the determined row and column indices. Associated pixels are drawn on the wedge for the selected set of at least one angle value having the retrieved pixel colors at the determined coordinates.

In accordance with yet another aspect of the invention, a system is provided for obtaining and representing sensor data. The system includes a plurality of sensors, each sensor collecting data along a plurality of points along an associated beam. A system memory stores the collected data from the plurality of sensors as a two-dimensional array. Each column in the array represents a beam associated with the one of the plurality of sensors, and each row in the array represents a radial distance. The system memory includes an angular reference table containing a plurality of angle values. A data translator includes an angle sampler that samples a subset of angle values for a given arc of a plurality of arcs that will comprise the wedge from the angular reference table such that the sampled angle values provide an even sampling along a representative portion of the length of the arc. The data translator further includes a pixel locator that determines horizontal and vertical coordinates for each of the sampled angle values and a pixel indexer that determines an associated row and column of the two-dimensional array for each of the sampled angle values and retrieves a color for each of the sampled angle values from the two-dimensional array according to the determined row and column. A graphic renderer draws pixels with the retrieved colors at the determined horizontal and vertical coordinates.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

Figure 1:
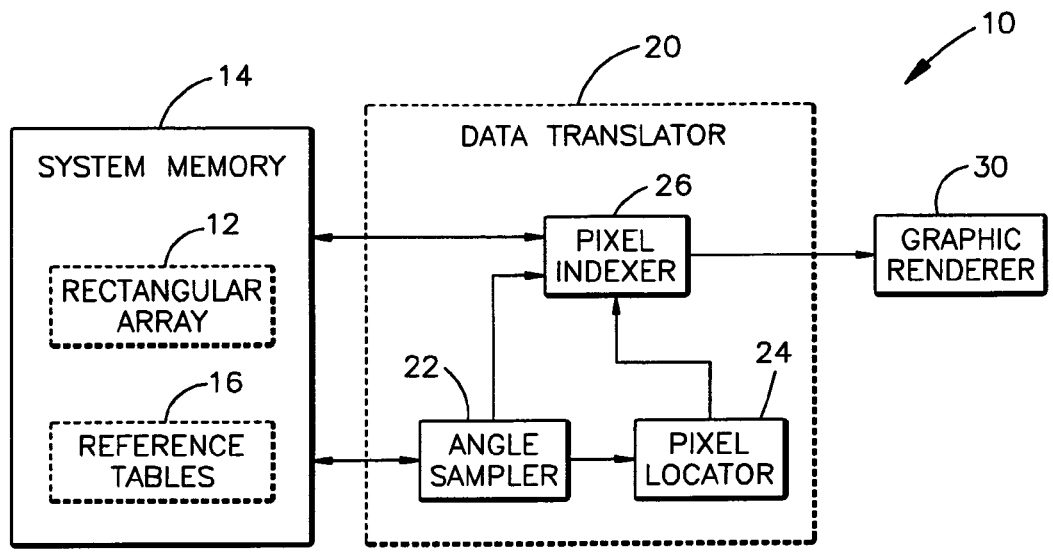
FIG. 1 illustrates a system for generating a wedge-shaped graphical representation of sensor data stored in a two-dimensional array.

FIG. 1 illustrates a system 10 for generating a wedge-shaped graphical representation of sensor data stored in a two-dimensional array 12. A system memory 14 stores the two-dimensional array of data 12 and a set of reference tables 16. The two-dimensional array 12 can include a plurality of columns, representing beams produced by respective sensors, having recorded values at each of a plurality of row positions, representing radial distances along the beams. It will be appreciated that the two-dimensional array 12 can be recorded in some form of rewritable memory, such that the values within the array can be altered as new measurements are taken.

It will be appreciated that the illustrated system 10 can be implemented in any appropriate environment for an electronic support measures system, including both stationary and mobile platforms. Accordingly, the present invention can be implemented on aircraft, watercraft, ground vehicles and installations, and spacecraft to detect RF emissions having suitable characteristics (e.g., stable period and repeating pulse patterns).

The reference tables 16 can include one or more of an angular value table comprising a plurality of angular values associated with the plurality of arcs comprising the wedge, sine and cosine values associated with the angular values comprising the angular value table, a table listing the length, in pixels, of each of the plurality of arcs, and a table containing angular boundaries associated with the plurality of beams that can be used to translate the angular value into a index representing a column of the two-dimensional array. The reference tables for a given arrangement of sensors do not change between sets of sensor data.

A data translator 10 translates the data from the two-dimensional array into an appropriate format for the wedge-shaped graphical representation. An angle sampler 12 selects an arc from the plurality of arcs comprising the wedge and determines a plurality of angular values for the selected arc. For example, an even sampling of angular values over all or a portion (e.g., half) of the arc can be taken from a reference table containing a plurality of angular values. In one implementation, the angle sampler 12 provides an even sampling of angular values over a representative portion of the arc, such that appropriate angular values and associated related values (e.g., sine and cosine values) representing the remainder of the arc can be determined from the sampled angular values and their associated related values. For example, angular symmetry of the arc can be exploited such that the angular values and related values from one portion of the arc can be represented at equal to or additive inverses of the sampled angular values and their related values. The arcs can be selected in any order. In one implementation, the arcs are selected in sequence from an innermost arc (e.g., closest to a vertex of the wedge) to an outermost arc.

The angular values are provided to a pixel locator 24 that determines horizontal and vertical coordinates for the pixel on the wedge-shaped graphical representation. The horizontal and vertical coordinates, x and y, for a given angular value, $\Theta$, in an arc having a radius, r, can be determined as follows:

$$x = r * \cos(\Theta) \quad y = r * \sin(\Theta) \qquad \text{Eq. 1}$$

In an exemplary embodiment, the sine and cosine values for each of the angular values are stored within the reference tables 16. A radius for each arc can be determined by adding an increment value representing the number of pixels between arcs to the radius of the previous arc. For example, where the arcs are one pixel thick, the radius of each arc simply increases by one.

An associated color for the pixel can be retrieved from the two-dimensional array at a pixel indexer 26. At the pixel indexer 26, a row and column index is determined for the pixel to indicate a position within the two-dimensional array. For example, the row index can be determined as the ratio of the total number of rows in the two-dimensional array and an index of the arc (e.g., counting from the vertex of the wedge to the outermost arc) to the total number of arcs necessary to generate the wedge. This information can be stored in a row reference table such that the index of the arc can be translated directly to a row index. The column index can be determined from known angular boundaries of the sensor beams represented by the two-dimensional array. For example, the boundaries of each beam represented in the array can be determined and provided in a reference table. This table can be used to generate a second table that directly translates a given angular value into a column index. Once a row and column index is determined, a color for the pixel is retrieved from the two-dimensional array.

The pixel coordinates and color are provided to a graphics renderer 30. The graphic renderer 30 provides a pixel in the specified location with the determined color. Where the arc is not sampled across its full length, coordinate and index values for unrepresented portions a given arc can be derived from the values determined for the sampled angle. For example, coordinate values and row and column indices determined for angular values sampled from the representative portion of the arc can be used to quickly determine corresponding values for positions on the remainder of the arc, for example, due to the symmetry of the wedge. In one implementation of the present invention, the pixels can have an order of priority, such that regions of overlap assume the color of the higher ranked pixel. For example, in a set of two overlapping pixels in a given arc, the innermost pixel can take precedence. It will be appreciated that other methods of determining priority can be utilized, including simply allowing the most recently drawn pixel to take precedence in the area of overlap.

Figure 2:
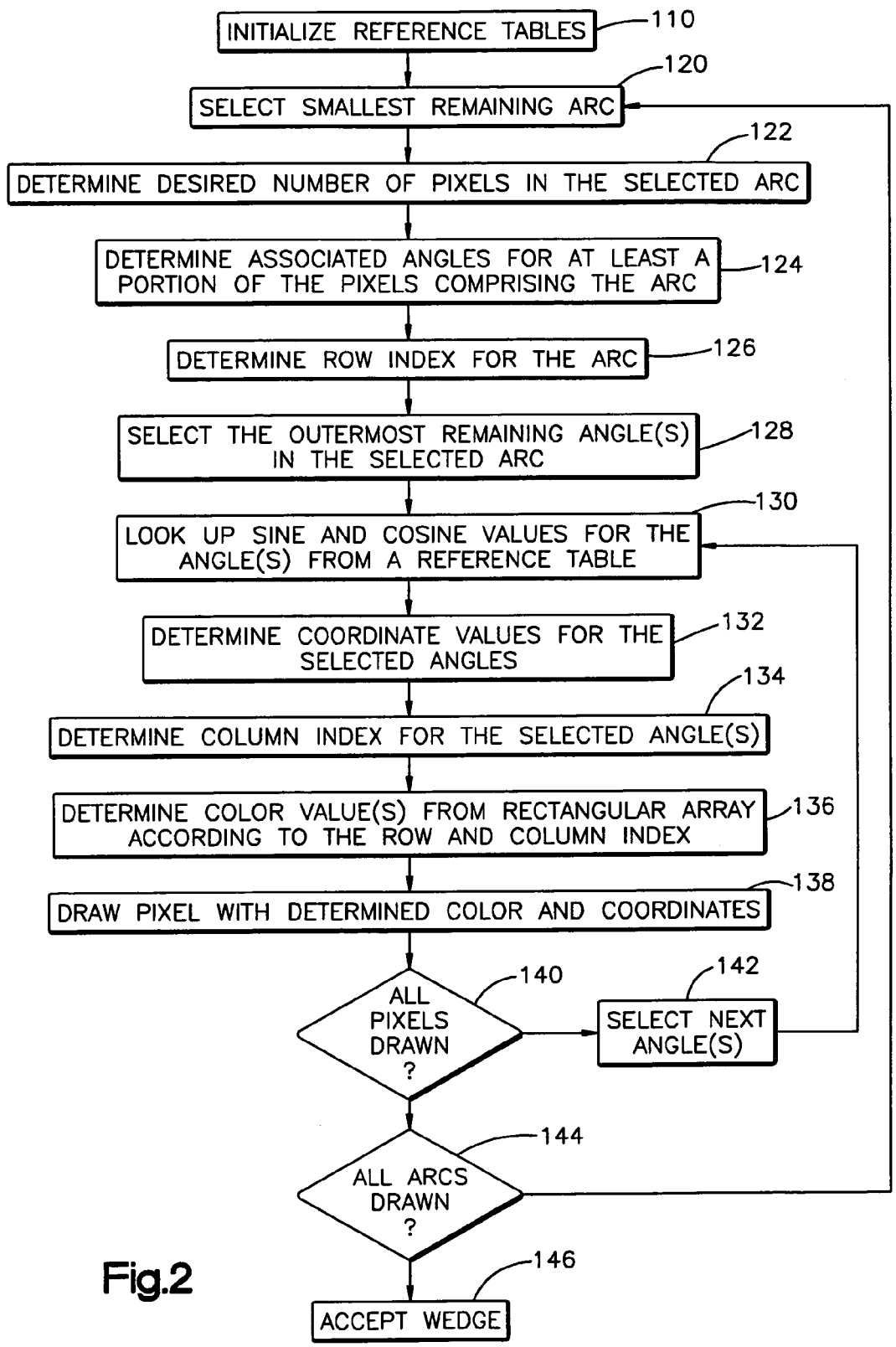
FIG. 2 illustrates an exemplary methodology for converting a two-dimensional array of data into a wedge shape in accordance with an aspect of the present invention.

FIG. 2 illustrates an exemplary methodology 100 for converting a two-dimensional array of data into a wedge-shaped graphic in accordance with an aspect of the present invention. The methodology 100 begins at step 110 where reference tables associated with the wedge are initialized. These reference tables can include one or more tables of values that can be reused through the generation of several arcs. For example, sine and cosine values associated with a number of angles of interest can be computed and saved in a table. Angular boundaries associated with each of a plurality of columns comprising the two-dimensional array can be stored as a table. Also, an ideal number of pixels for each arc can be determined according to the arc length and stored in memory.

At step 120, the smallest remaining arc position associated with the wedge shaped graphic is selected. For example, the process can begin at the vertex of the wedge and advances through each successive arc until the outermost arc is reached. It will be appreciated, however, that in an alternate implementation, the arcs could be drawn in another order (e.g., largest or outermost to smallest or innermost). At step 122, a number of desired pixels in the selected arc is determined. For example, a number of pixels necessary to form a contiguous arc can be determined from a reference table or calculated from known properties of the arc. In one implementation, the ideal number of pixels can be multiplied by a constant value to ensure that enough pixels are available to produce a smooth arc.

At step 124, associated angle values are determined for the pixels that will comprise the arc. For example, an evenly spaced set of samples can be taken from a reference table having a number of sine and cosine values to represent all of a portion of the pixels comprising the arc. In one implementation, an even sampling of angular values is taken over a representative portion of the arc, such that appropriate angular values and associated related values (e.g., sine and cosine values) representing the remainder of the arc can be determined from the sampled angular values and their associated related values. At step 126, a row index, corresponding to the vertical position of a row in the two-dimensional array that corresponds to the arc, is determined for the arc. This can include retrieving an index value for the row from a reference table or calculating the row index from known values. In an exemplary implementation, the row index can be calculated as:

$$\frac{r*n}{a} \qquad \text{Eq. 2}$$

where r is the total number of rows in the two dimensional array, a is the total number of arcs necessary to generate the wedge, and n is the number of the arc counting from the vertex of the wedge to the outermost arc.

At step 128, one or more outermost angle values of the arc are selected. In other words, one or more angles having the largest absolute values are selected. In accordance with an aspect of the present invention, the outermost pixel on each side can be selected to take advantage of the symmetry of the wedge in determining appropriate coordinates for each point, as the two points are located at the same angle from the axis of the wedge. At step 130, sine and cosine values for the selected angle are retrieved from a reference table. It will be appreciated that the selection of the angles for the arc at step 124 can be performed as to ensure that the selected angles are represented on the reference table. For example, the angles can be selected by taking an even sampling of some or all of the number of desired points from the reference table containing the sine and cosine values. Alternatively, the determined angle can be mapped to the nearest value on the table. It will be appreciated that the angles can be selected as to represent a representative portion of the arc, such that values associated with each selected angle can be reflected across an axis of symmetry associated with the wedge. This would allow values for both sides of the wedge to be determined at the same time without significantly increasing the computational expense.

At step 132, coordinate values are determined for the selected pixels to determine the coordinates at which the pixels should be drawn. For example, a horizontal coordinate for a given pixel can be determined as the product of a radius, r, of the selected arc and the cosine of the angle, and a vertical coordinate, y, can be determined as the product of the radius and the sine of the angle. Where an angle associated with a first side of the wedge has been selected, it will be appreciated that the coordinates will be symmetric across the axis of the wedge, such that a corresponding set of coordinates can be determined for an angle representing a second side of the wedge. For example, where the wedge serves a vertical axis, the pixels on the second side of the wedge will have equal vertical coordinates and horizontal coordinates that are equal in magnitude and opposite in sign to the corresponding pixels on the first side of the wedge.

At step 134, a column index is determined for the selected pixels. It will be appreciated that the angular boundaries of the beams represented by the two-dimensional array are known, and the boundaries of the beams comprising the array can be provided in a boundary reference table. A column reference table comprising appropriate column indices for each of a plurality of angular values can be determined from this table during an initiation process, such that a column index for a given pixel can be determined via a direct index to the column reference table using the angular value associated with the pixel. At step 136, a color for the pixel can be determined from the two-dimensional array using the determined row and column index. The pixel is then drawn at the determined coordinates in the determined color at step 138.

At step 140, it is determined if additional pixels remain in the arc to be drawn. If so (Y), a set of one or more outermost angles are selected from the remaining pixels. The methodology then returns to step 130 to determine coordinates and an associated color for the one or more pixels represented by the selected set of angles. If the arc is completed (N), it is determined at step 142 if additional arcs remain to be drawn. If additional arcs remain (Y), the methodology returns to step 120 to select the next arc in sequence. If all arcs have been drawn (N), the wedge is accepted at step 146.

Figure 3:
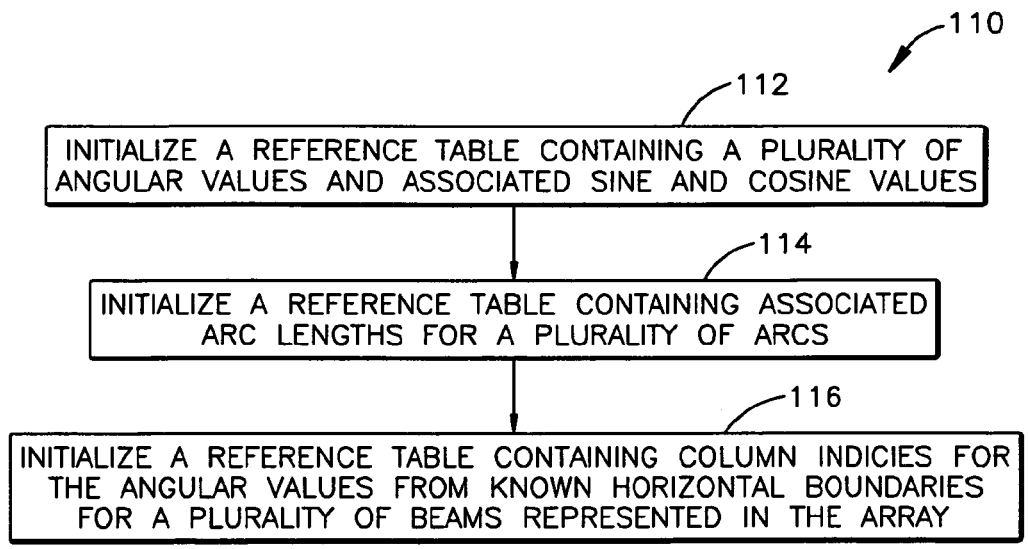
FIG. 3 illustrates an exemplary methodology for initializing a plurality of reference tables in accordance with an aspect of the present invention.

FIG. 3 illustrates an exemplary methodology 210 for initializing a plurality of reference tables in accordance with an aspect of the present invention. At step 212, a reference table containing a plurality of angular values and their associated sine and cosine values is produced. In one implementation, the largest (e.g., outermost) arc can be divided into a plurality of segments, representing a desired number of pixels to produce a smooth rendition of the arc. An angle associated with each segment relative to a central axis of the wedge can be determined, and the sine and cosine of each angle can be calculated to a desired degree of resolution.

At step 214, a reference table is initialized containing arc lengths for a plurality of arcs comprising the wedge. The length of each arc can be known from the properties of the wedge display. A desired number of pixels for a given arc can be determined from the arc length as the number of pixels comprising the arc, multiplied by a value equal to one plus a small constant value. This multiplier ensures that the arc will be rendered smoothly.

At step 216, a reference table containing a column index for each of the angular values is initialized from boundaries for the plurality of beams. The actual boundaries of a plurality of sensor beams can be known for a given application. This can be scaled down into the wedge display, such that the line defining each boundary can be known. Thus, the angular value where each arc transitions between beams is included in the table. Accordingly, a column index for a given pixel having known coordinates can be determined as a direct index to the table without any computation.

Figure 4:
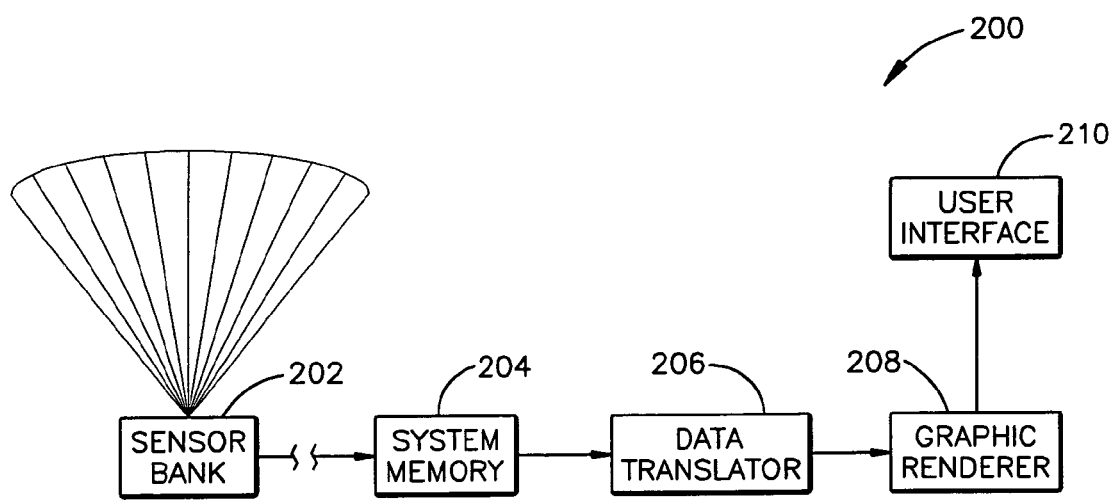
FIG. 4 illustrates a system for obtaining and representing sensor data in a wedge arrangement in accordance with an aspect of the present invention.

FIG. 4 illustrates a system 200 for obtaining and representing sensor data in a wedge arrangement in accordance with an aspect of the present invention. The system includes a plurality of sensors in a sensor bank 202. Each sensor collects data for a plurality of points along an associated beam. For example, the sensor bank 202 can comprise a sonar, radar, or ultrasonic arrangement.

The data provided by each sensor is provided to a system memory 204 that stores the collected data from the plurality of sensors as a two-dimensional array. For example, the raw sensor measurements can be stored in memory or translated to a color value representing the measurement. Each column within the two-dimensional array represents the beam associated with the one of the plurality of sensors, and each row represents a radial distance. The system memory can include a plurality of reference tables to facilitate the conversion of the two-dimensional array into a graphical display, including an angular reference table containing a plurality of angle values.

A data translator 206 is operative to convert the two-dimensional array into a wedge-shaped graphical display. For example, the data translator 206 can include an angle sampler that selects a plurality of angular values for a given arc. For example, the angle sampler can sample a subset of angle values for a given arc of a plurality of arcs comprising the wedge from the angular reference table such that the selected angles provide an even sampling along the length of the arc.

The data translator 206 can further include a pixel locator that determines horizontal and vertical coordinates for each of the selected angle values. For example, the coordinates can be determined according to the radius of the arc and the sine and cosine of the angle value. A pixel indexer can determines an associated row and column of the two-dimensional array for each of the subset of angle values and retrieves a color for each of the plurality of angle values from the two-dimensional array according to the determined row and column. It will be appreciated that the data in the array can also be stored as numerical data that is translated to a color at the pixel indexer.

The determined pixel coordinates and the retrieved color is then provided to a graphic renderer 208 that draws pixels with the retrieved colors at the determined horizontal and vertical coordinates. The graphic renderer 208 can render the pixels in a determined order either individually or in pairs. For example, the pixels can be drawn from the outside of an arc in, starting with the smallest arc. Once the arc is completed, it can be displayed to a user at a user interface 210. It will be appreciated that the illustrated system 200 is sufficiently efficient that the graphic provided at the user interface 210 can be refreshed at a high rate to provide the user with current information even under rapidly changing conditions.

Figure 5:
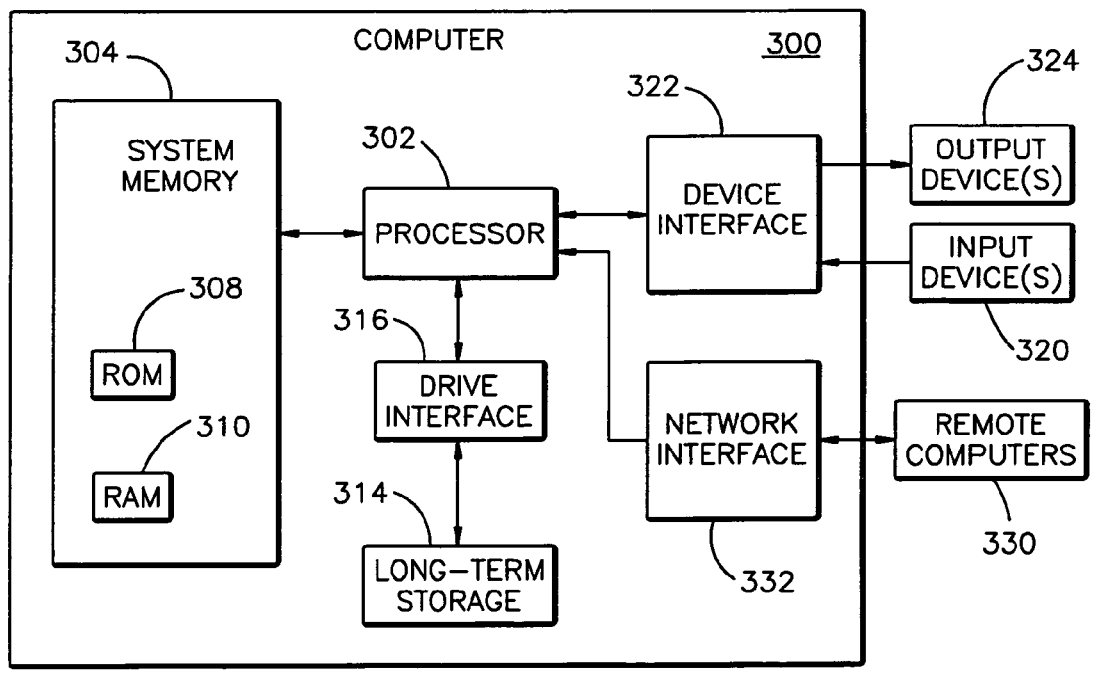
FIG. 5 illustrates a computer system that can be employed to implement systems and methods described herein, such as based on computer executable instructions running on the computer system.

FIG. 5 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus 306 by one or more a parallel port, a serial port or a universal serial bus (USB). One or more output device(s) 324, such as a visual display device or printer, can also be connected to the processor 302 via the device interface 322.

The computer system 300 may operate in a networked environment using logical connections (e.g., a local area network (LAN) or wide area network (WAN) to one or more remote computers 330. The remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

Having described the invention, the following is claimed:

1. A computer program product, implemented on a computer readable medium and operative within a data processing system, for drawing a wedge from a two-dimensional array of data having color data arranged in rows and columns, comprising:

an angular reference table containing a plurality of angle values;

an angle sampler that samples a subset of angle values for a given arc of a plurality of arcs that will comprise the wedge from the angular reference table such that the sampled angle values provide an even sampling along a representative portion of the arc;

a pixel locator that determines horizontal and vertical coordinates for each of the subset of angle values;

a pixel indexer that determines an associated row and column of the two-dimensional array for each of the sampled angle values and retrieves a color for each of the sampled angle values from the two-dimensional array according to the determined row and column;

a column reference table that specifies an associated column index for each of the plurality of angle values, the pixel indexer being operative to retrieve data from the column reference table;

a boundary reference table comprising boundaries associated with each column along the plurality of arcs, the column reference table being generated from the boundary reference table and a graphical renderer that draws pixels with the retrieved colors at the determined horizontal and vertical coordinates.

2. The computer program product of claim 1, wherein the pixel locator is operative, for each angular value in the subset of angular values, to determine a first pixel having a first horizontal coordinate and a first vertical coordinate, and a second pixel, reflected across an axis of symmetry associated with the wedge, having a second horizontal coordinate and a second vertical coordinate.

3. The computer program product of claim 1, the angular reference table further comprising sine and cosine values for each of the plurality of associated angles.

4. The computer program product of claim 1, further comprising an arc reference table comprising an associated arc length for each of the plurality of arcs that will comprise the wedge.

5. A method for drawing a wedge from a two-dimensional array of data having color data arranged in rows and columns comprising:

determining a desired number of pixels in an outermost arc of the wedge;

dividing the outermost arc into a number of segments, each segment having an associated angle with a central axis;

storing a representative portion of the associated angles of the plurality of segments and their associated sine and cosine values as the table of reference angle values;

selecting an arc from the plurality of arcs that will comprise the wedge;

selecting an even sampling of the stored angles and their associated sine and cosine values as a selected set of angle values associated with the selected arc determining horizontal and vertical coordinates for each of the angle values comprising the selected set of at least one angle value;

determining associated row and column indices for each of the selected set of at least one angle value;

retrieving associated pixel colors from the two-dimensional array with the determined row and column indices; and drawing associated pixels on the wedge for the selected set of at least one angle value having the retrieved pixel colors at the determined coordinates.

6. The method of claim 5, wherein determining horizontal and vertical coordinates for each of the angle values comprising the selected set of at least one angle value comprises the following steps:

determining a first horizontal coordinate and a first vertical coordinate, representing a first pixel that corresponds to a given angle value; and determining a second horizontal coordinate and a second vertical coordinate pixel, representing a second pixel that corresponds to the angle value, the second pixel comprising a reflection of the first pixel across an axis of symmetry associated with the wedge.

7. The method of claim 6, wherein determining the first horizontal coordinate corresponding to the angle value comprises multiplying the cosine of the angle value with the known radius of the arc, and determining the first vertical coordinate corresponding to the given angle value comprises multiplying the sine of the angle value with the known radius of the arc.

8. The method of claim 6, wherein the first vertical coordinate is equal to the second vertical coordinate, and the first horizontal coordinate is equal in magnitude and opposite in sign to the second horizontal coordinate.

9. The method of claim 5, wherein determining the row index of a given angle value comprises comparing an index associated with the selected arc to a row reference table.

10. The method of claim 9, further comprising the steps of:

determining for each arc the ratio of the product of the total number of rows in the two dimensional array and an index of the arc to a total number of arcs necessary to generate the wedge to provide a row index for the arc; and storing the arc index and the row index in the row reference table.

11. A system, implemented on an aircraft, for obtaining and representing sensor data, comprising:

a plurality of sensors, each sensor collecting data along a plurality of points along an associated beam;

a system memory that stores the collected data from the plurality of sensors as a two-dimensional array of color data, wherein each column represents a beam associated with the one of the plurality of sensors, and each row represents a radial distance and includes an angular reference table containing a plurality of angle values;

a data translator, comprising:

an angle sampler that samples a subset of angle values for a given arc of a plurality of arcs that will comprise the wedge from the angular reference table such that the sampled angles provide an even sampling along a representative portion of the length of the arc;

a pixel locator that determines horizontal and vertical coordinates for each of the sampled angle values; and a pixel indexer that determines an associated row and column of the two-dimensional array for each of the sampled angle values and retrieves a color for each of the sampled values from the two-dimensional array according to the determined row and column; and a graphic renderer that draws pixels with the retrieved colors at the determined horizontal and vertical coordinates;

wherein each of the plurality of sensors, the system memory, the data translator, and the graphic renderer are implemented on the aircraft.

12. The system of claim 11, wherein the pixel locator is operative, for each angular value in the subset of angular values, to determine a first pixel having a first horizontal coordinate and a first vertical coordinate, and a second pixel, reflected across an axis of symmetry associated with the wedge, having a second horizontal coordinate and a second vertical coordinate.

13. The system of claim 12, wherein the pixel indexer is operative to determine a common row index for the first and second pixels, determine a first column index for the first pixel, and derive a second column index for the second pixel from the first column index according to the associated axis of symmetry of the wedge.

14. The system of claim 11, further comprising a column reference table that specifies an associated column index for each of the plurality of angle values, the pixel indexer being operative to retrieve data from the column reference table.

15. The system of claim 11, further comprising a row reference table that specifies an associated row index for each of the plurality of arcs that will comprise the wedge, the pixel indexer being operative to retrieve data from the row reference table.

16. A computer program product, implemented on a computer readable medium and operative within a data processing system, for drawing a wedge from a two-dimensional array of data having color data arranged in rows and columns, comprising:

an angular reference table containing a plurality of angle values;

an angle sampler that samples a subset of angle values for a given arc of a plurality of arcs that will comprise the wedge from the angular reference table such that the sampled angle values provide an even sampling along a representative portion of the arc;

a pixel locator that determines horizontal and vertical coordinates for each of the subset of angle values;

a boundary reference table comprising boundaries associated with each column along the plurality of arcs;

a column reference table, generated from the boundary reference table, that specifies an associated column index for each of the plurality of angle values;

a pixel indexer that determines an associated row and column of the two-dimensional array for each of the sampled angle values, the associated column being determined from the column index associated with each sampled angle value, and retrieves a color for each of the sampled angle values from the two-dimensional array according to the determined row and column; and a graphical renderer that draws pixels with the retrieved colors at the determined horizontal and vertical coordinates.

17. The computer program product of claim 16, wherein the pixel locator is operative, for each angular value in the subset of angular values, to determine a first pixel having a first horizontal coordinate and a first vertical coordinate, and a second pixel, reflected across an axis of symmetry associated with the wedge, having a second horizontal coordinate and a second vertical coordinate.

18. The computer program product of claim 16, further comprising an arc reference table comprising an associated arc length for each of the plurality of arcs that will comprise the wedge.

19. A system for obtaining and representing sensor data, comprising:
- a plurality of sensors, each sensor collecting data along a plurality of points along an associated beam;
- a system memory that stores the collected data from the plurality of sensors as a two-dimensional array of color data, wherein each column represents a beam associated with the one of the plurality of sensors, and each row represents a radial distance and includes an angular reference table containing a plurality of angle values;
- a data translator, comprising:
    - an angle sampler that samples a subset of angle values for a given arc off a plurality of arcs that will comprise the wedge from the angular reference table;
    - a pixel locator that, for each of the sampled angle values, determines a first pixel, having a first horizontal coordinate and a first vertical coordinate, and a second pixel, reflected across an axis of symmetry associated with the wedge, having a second horizontal coordinate and a second vertical coordinate; and
    - a pixel indexer that, for each of the sampled angle values, determines a common row index for the first and second pixels, determines a first column index for the first pixel, derives a second column index for the second pixel from the first column index according to the associated axis of symmetry of the wedge, and retrieves a color for the first and second pixels associated with each of the sampled values from the two-dimensional array according to the determined row and column indices for each pixel; and
- a graphic renderer that draws pixels with the retrieved colors at the determined horizontal and vertical coordinates.

20. The system of claim 19, further comprising a column reference table that specifies an associated column index for each of the plurality of angle values, the pixel indexer being operative to retrieve data from the column reference table.

21. The system of claim 20, further comprising a boundary reference table comprising boundaries associated with each column along the plurality of arcs, the column reference table being generated from the boundary reference table.

* * * * *